(12) United States Patent
Martinez et al.

(10) Patent No.: US 9,851,067 B2
(45) Date of Patent: Dec. 26, 2017

(54) MOTOR VEHICLE LIGHT DEVICE

(71) Applicant: VALEO ILUMINACION, Martos (ES)

(72) Inventors: Juan Manuel Martinez, Granada (ES); Eric Moisy, Jaen (ES); Manuel Joyanes, Martos (ES); Mari-Carmen Marquez, Torredonjimo (ES); Maria Del Carmen Montano, Martos (ES); Jose-Maria Martos, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 15/053,210

(22) Filed: Feb. 25, 2016

(65) Prior Publication Data

US 2016/0252228 A1     Sep. 1, 2016

(30) Foreign Application Priority Data

Feb. 26, 2015   (FR) ..................... 15 51664

(51) Int. Cl.
*F21S 8/10* (2006.01)
*F21V 8/00* (2006.01)
*B60Q 3/64* (2017.01)

(52) U.S. Cl.
CPC ......... *F21S 48/2243* (2013.01); *F21S 48/215* (2013.01); *F21S 48/2262* (2013.01); *F21S 48/2268* (2013.01); *G02B 6/002* (2013.01); *G02B 6/0018* (2013.01); *G02B 6/0023* (2013.01); *G02B 6/0038* (2013.01); *G02B 6/0043* (2013.01); *G02B 6/0048* (2013.01); *B60Q 3/64* (2017.02); *G02B 6/0065* (2013.01)

(58) Field of Classification Search
CPC .. F21S 48/2243; F21S 48/1241; F21S 48/215; F21S 48/2262; F21S 48/2268; G02B 6/0018; G02B 6/002; G02B 6/0048; G02B 6/0023; G02B 6/0038; G02B 6/0043; G02B 6/0065; B60Q 3/64
See application file for complete search history.

(56) References Cited

U.S. PATENT DOCUMENTS

2011/0187967 A1*  8/2011  Shinohara ............ G02B 6/0016
                                                         349/65
2015/0355505 A1   12/2015  Overes et al.

FOREIGN PATENT DOCUMENTS

WO        2013117755 A1    8/2013

* cited by examiner

*Primary Examiner* — Donald Raleigh
*Assistant Examiner* — Kevin Quarterman
(74) *Attorney, Agent, or Firm* — Oblon, McClelland, Maier & Neustadt, L.L.P.

(57) ABSTRACT

A motor vehicle light device, comprising a light guide layer equipped with optical decoupling zones, and a light generator able to send light toward the light guide layer. The light guide layer is locally covered with a light-absorbing material.

19 Claims, 6 Drawing Sheets

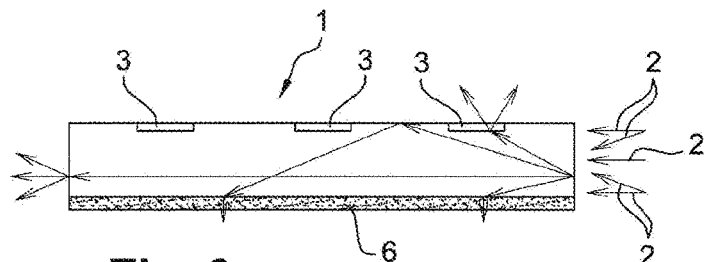
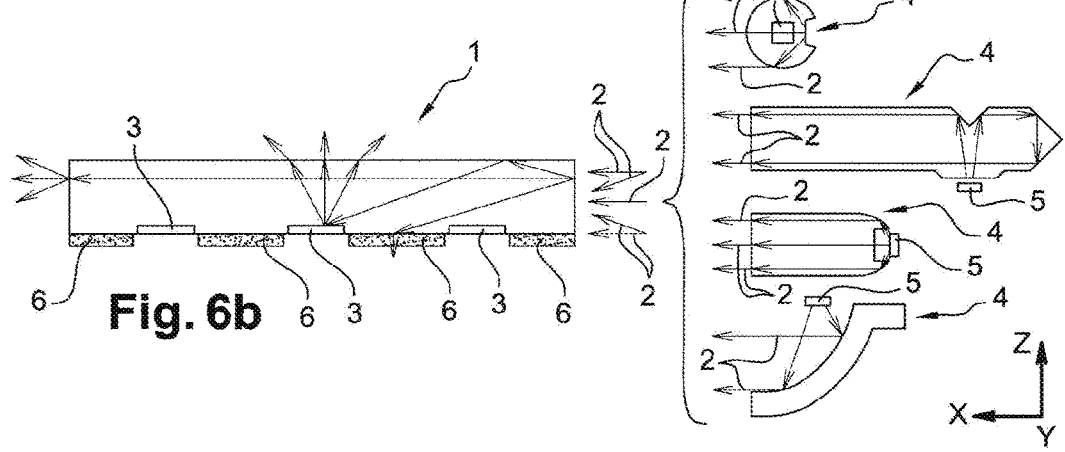
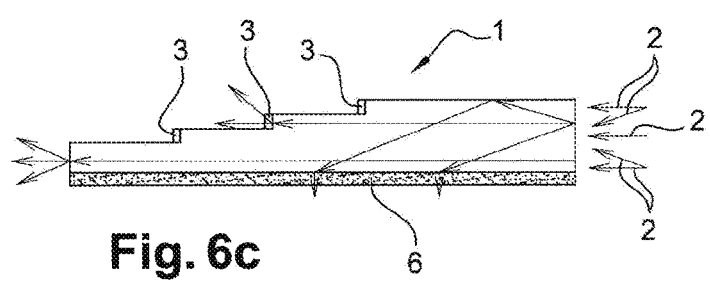
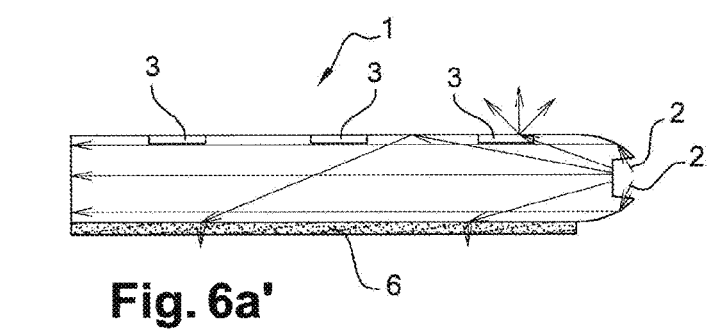
Fig. 6a
Fig. 6b
Fig. 6c
Fig. 6a'

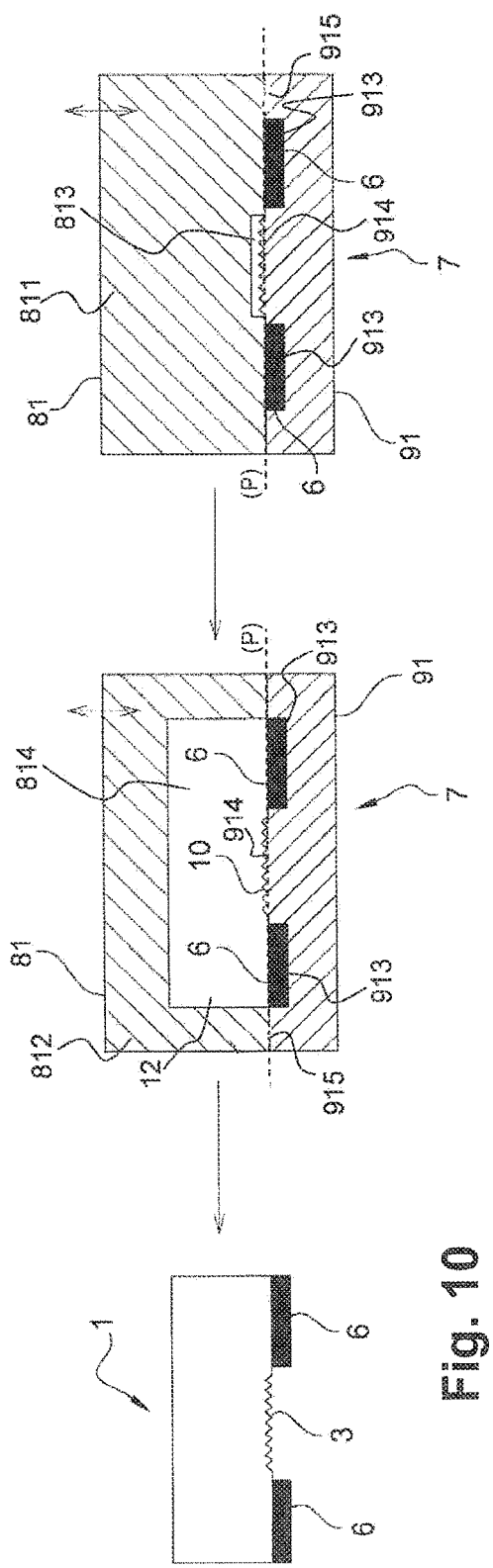
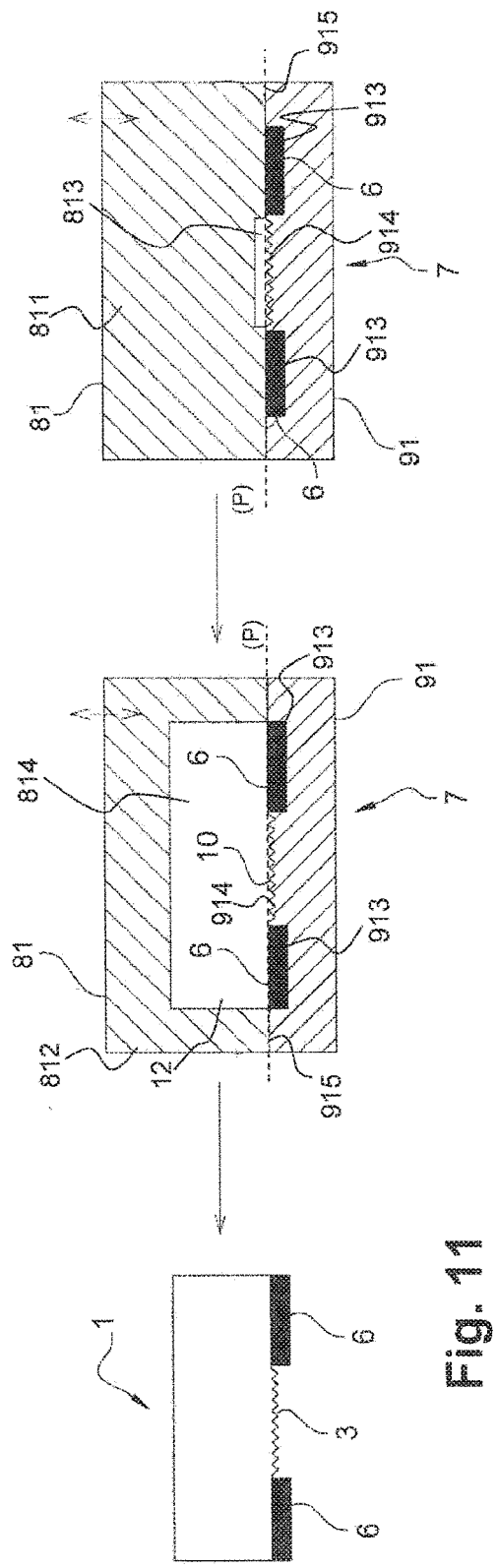
Fig. 10
Fig. 11

# MOTOR VEHICLE LIGHT DEVICE

CROSS-REFERENCE TO RELATED APPLICATIONS

This application claims priority to French application 1551664 filed on Feb. 26, 2015, which application is incorporated herein by reference and made a part hereof.

BACKGROUND OF THE INVENTION

1. Field of the Invention

The subject of the present invention is a vehicle light device comprising a light guide layer. One preferred application of the invention is the field of automotive equipment for producing light flux used to signal the presence of the vehicle and/or to illuminate part of the surroundings of the vehicle.

Thus, the vehicle light device according to the invention may be:
- a motor vehicle lighting device in the strict sense, also referred to as a road lighting device; for example a headlamp, also referred to as a headlight,
- a signaling device, such as a turn signal, a stop light, an urban driving light, a nighttime position light or daytime position light (also referred to as a daytime running light or DRL),
- a vehicle interior lighting device, such as a roof light or a wall light.

2. Description of the Related Art

It is common practice to group several lighting and/or signaling functions together into a single housing so as to simplify the electric wiring of these various functions in a motor vehicle.

Moreover, the shape of lighting and/or signaling lights plays an important part in the search for a novel style and look that will allow the motor vehicle to be recognized from afar.

In order to achieve these objectives, it is known practice for the vehicle to be fitted with light guides, also known as layers to guide rays of light.

When looking at a mass or volume light guide, the light inside the guide emerges in accordance with the Snell-Descartes law, according to the value of its angles of reflection and the refractive indices of the various media.

Figure 1:
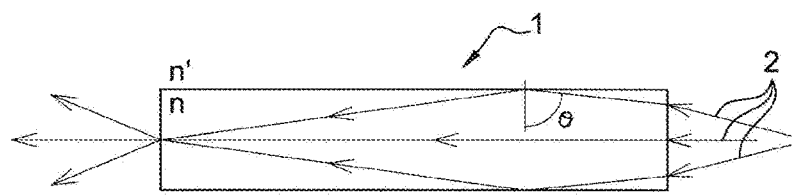

As illustrated in FIG. 1, a light guide 1 is illuminated with rays of light 2.

The light may be reflected or refracted at the boundary between two different media according to the value of the refractive indices n and n' thereof. According to the Snell-Descartes law, the beam of light changes direction as it passes from one medium to the other.

When, for a ray of light 2, the angle θ between the ray of light and the normal to the surface between the medium of index n and the medium of index n' exceeds a limit angle $\theta_{lim}$, the ray 2 is totally internally reflected within the initial medium n (FIG. 1), with a loss of energy.

Figure 2:
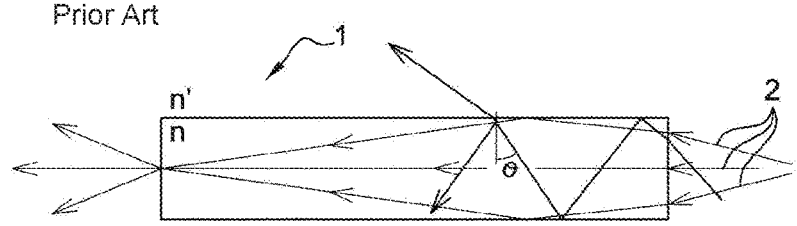

As illustrated in FIG. 2, when the angle θ is below the limit angle $\theta_{lim}$, the ray 2 is partially refracted in the external medium of index n', the other part being reflected within the medium of index n.

This principle works perfectly well when the exterior surfaces of the surface or volume light guide 1 are perfectly uniform and polished. Any degradation to one of these surfaces, for example to a zone 3 through a treatment of the graining, striation type etc., causes the light to exit by refraction at the interior surface of the guide (FIG. 3), the output dropping rapidly because there is a loss of energy according to the physical laws of wave guides.

Figure 3:
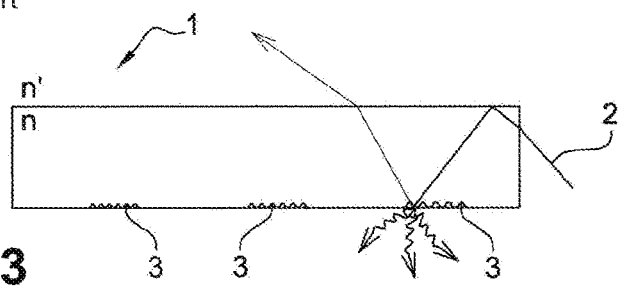
Figure 4:
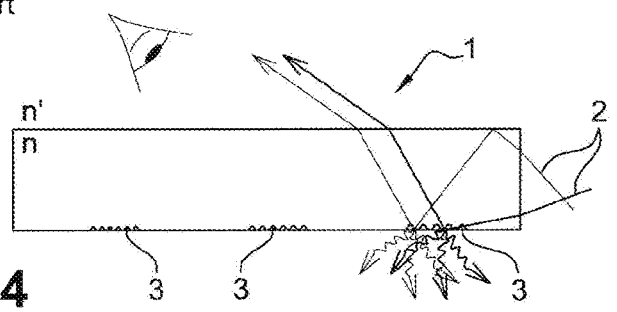

In order to create decorations, all that is required is to define a particular optical pattern, for example using a treatment described hereinabove and illustrated in FIG. 3, so that the optical pattern is visible to an external observer (FIG. 4). Thus, the zone 3 constitutes a zone of optical decoupling allowing the rays of light 2 to be deflected and thus refracted toward the external medium in order to exit the guide 1 and spread in a direction of illumination.

Figure 5:
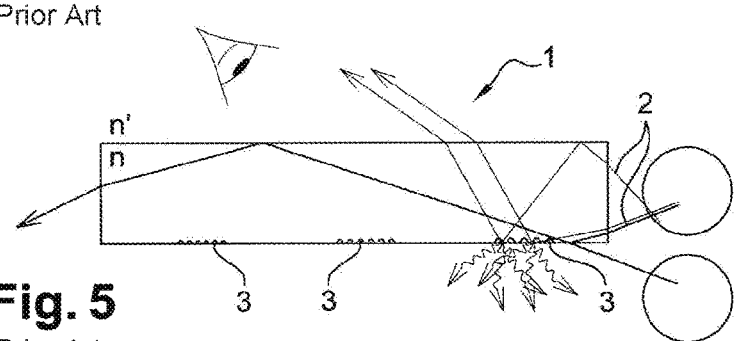

However, to an external observer, the light guide 1 behaves on its lower faces like a mirror, thus generating reflections and ghosting inside the guide 1, detracting from the correct appreciation of the decorative optical patterns. This is in addition to the refracted beams which likewise exit the light guide 1 (FIG. 5).

SUMMARY OF THE INVENTION

The present invention seeks to overcome these disadvantages.

It in particular proposes a motor vehicle lighting or signaling device that is able to overcome these problems of undesired reflections and refractions.

Thus, the subject of the invention is a motor vehicle light device, comprising:
- a light guide layer equipped with optical decoupling zones, and
- a light generator able to send light toward the light guide layer.

In the device according to the invention, the light guide layer is locally covered with a light-absorbing material. Thus, the presence of this light-absorbing material on one or more predetermined zones allows the rays of light to be absorbed in these zones where there is a wish to avoid undesired reflections and refractions.

According to one embodiment of the invention, the material absorbs between 60% and 100% of the rays of light impinging upon it, preferably at least between 90% and 100%.

The light generator may comprise at least one semiconductor emitter element, notably a light emitting diode.

The device may comprise a collimator and/or a light guide receiving the rays of light from the light source and passing them on toward the light guide layer.

The collimator and/or the light guide may be formed as an integral part of the guide layer.

The light generator may be integrated into the light guide layer.

The light-absorbing material may be an opaque material.

The optical decoupling zones may be able to pass light in a direction different than the direction of the light coming from the light generator.

The optical decoupling zones may be able to pass light in a direction identical to the direction of the light coming from the light generator.

In a first embodiment, the optical decoupling zones may be arranged on a first face of the light guide layer and the light-absorbing material may be arranged on the entirety of a second face of the light guide layer that is the opposite face to this first face. For example, the first face is the upper face of the guide layer and the opposite face is the lower face of the guide face.

In a second embodiment, the optical decoupling zones may be arranged on the second face, notably the lower face, of the light guide layer and the light-absorbing material may be arranged on the second face of the light guide layer, between the optical decoupling zones.

In a third embodiment, the optical decoupling zones may be arranged on walls of the light guide layer, these walls being oriented in such a way as to form an angle, notably an angle of 90°, with the first wall and the light-absorbing material being able to be arranged on the entirety of the second face of the light guide layer.

Another subject of the invention is a mold for a light guide for a motor vehicle light device, comprising at least a first part comprising at least one cavity, and at least a second part comprising at least a first and a second sub-part, at least one of the first and second sub-parts comprising at least one cavity. At least one of the first and second parts is able to move so that each of the sub-parts is able in turn to come into contact with the first part.

Furthermore, the invention has the following features, considered alone or in combination:
- the cavity of the first part and the cavity of one of the first and second sub-parts come into contact to form a single-impression mold. What is meant by a "single-impression mold" is that each cavity of each part can be filled at the same time and via the same injection orifice,
- the first part and one of the first and second sub-parts come into contact along a parting line, each cavity opening onto the parting line,
- one of the first and second parts is mounted with rotational mobility,
- one of the first and second parts is mounted with translational mobility,
- one of the first and second parts is mounted fixed,
- the other of the first and second sub-parts has no cavities,
- the first and second sub-parts each have at least one cavity,
- one of the first and second parts of the mold comprises striations,
- the striations project from the surface of the mold part and facing the other part of the mold,
- the other of the first and second sub-parts comprises the striations,
- the two sub-parts are formed together from the same material,
- the first comprises at least one injection orifice intended to allow the cavity of the first part to be filled with material,
- at least one of the first and second sub-parts comprises at least one injection orifice intended to allow the cavity of one of the first and second sub-parts to be filled with material.

A further subject of the invention is a method for molding a motor vehicle light device, using a mold of the present invention. It comprises the following steps:
- bringing the first part and one of the first and second sub-parts into contact,
- first injection of material into the or each cavity of the first part,
- moving of one of the first and second parts in order to bring the first part into contact with the other of the first and second sub-parts,
- second injection of material into the or each cavity of the second part.

In addition, the invention has the following features, considered alone or in combination:
- at least a first step of solidification of the material after the injection of material into the first molding impression,
- at least a second step of solidification of the material after the injection of material into the second molding impression,
- the final step is a demolding step,
- the moving of one of the first and second parts is a movement in translation then in rotation then in translation.

These and other objects and advantages of the invention will be apparent from the following description, the accompanying drawings and the appended claims.

BRIEF DESCRIPTION OF THE ACCOMPANYING DRAWINGS

Further features and advantages of the present invention will become more clearly apparent from reading the following description given by way of nonlimiting example and given with reference to the attached drawings in which:

FIGS. 1 to 5, already described, illustrate a guide layer of a lighting or signaling device of the prior art;

FIGS. 6 to 9 illustrate a lighting or signaling device according to the invention according to various embodiments; and FIGS. 10 to 14 illustrate various embodiments of a method of manufacturing a lighting or signaling device according to the invention.

DETAILED DESCRIPTION OF THE PREFERRED EMBODIMENTS

As illustrated in FIGS. 6a, 6b, 6c and 6a', a lighting or signaling device according to the invention comprises a light generator, which in this example comprises a collimator 4, and a light guide layer 1. The rays of light 2 coming from the collimator 4 are emitted toward the light guide layer 1 along a horizontal axis x. Four possible examples of collimators 4 are illustrated in FIG. 6, it being possible for each collimator 4 to be equipped with at least one light source 5, such as a light emitting diode.

The light collimated by the collimator 4 enters the light guide layer 1. The light guide layer 1 is equipped with optical decoupling zones 3, particularly diffractive optical decoupling zones 3 that allow the rays of light 2 to be deflected and thus refracted toward the external medium so that they exit the light guide layer 1 and spread in a direction of illumination. The optical decoupling zones 3 may be obtained for example by graining, striation or even by the use of optical beads or inclined facets, notably of the micro-prism type. The decoupling elements of the optical decoupling zones 3, such as the facets or striations, form reflective surfaces and are oriented in such a way as to reflect transversely the rays of light spreading along the light guide layer 1, so that they exit the light guide layer 1 and spread in the main direction of illumination.

The rays of light 2 passing from right to left in the direction indicated by the arrows thus exit the light guide layer 1 both via the left-hand end of the light guide layer 1, so as to obtain the desired photometric grid, and via the optical decoupling zones 3, so as to confer upon the lighting or signaling device a light signature and graphic appearance.

In accordance with the invention, the light guide layer 1 is covered locally, for example on one or more external zones of the light guide layer 1, with a light-absorbing material 6, typically an opaque material. The opaque material 6 makes it possible to absorb the rays of light in the zones where there is a wish to avoid undesired reflections and refractions.

Four possible embodiments of the light guide layer 1 are illustrated.

In a first embodiment illustrated in FIG. 6a, the optical decoupling zones 3 are arranged horizontally on the upper face of the light guide layer 1. The opaque material 6 is arranged over the entirety of the lower face of the light guide layer 1. Thus, the rays of light 2 heading toward the bottom of the light guide layer 1 are absorbed by the opaque material 6, making it possible to avoid unwanted reflections and refractions of these rays of light 2.

In a second embodiment illustrated in FIG. 6b, the optical decoupling zones 3 are arranged horizontally on the lower face of the light guide layer 1, for example at regular intervals. The opaque material 6 is arranged on the lower face of the light guide layer 1, between the optical decoupling zones 3, making it possible to absorb the rays of light 2 between the optical decoupling zones 3.

In a third embodiment illustrated in FIG. 6c, the optical decoupling zones 3 are arranged vertically, on vertical walls of the light guide layer 1, which is, for example, configured like a staircase. The opaque material 6 is arranged on the entirety of the lower face of the light guide layer 1, and the rays of light 2 heading toward the bottom of the light guide layer 1 are absorbed by the opaque material 6.

In an alternative form of the first embodiment, which is illustrated in FIG. 6b, the light source or collimator 4 may form part of the light guide layer 1.

It is thus possible to conceive of any combination of the light guide layer 1 according to one of the first three embodiments, with any collimator 4.

Figure 7:
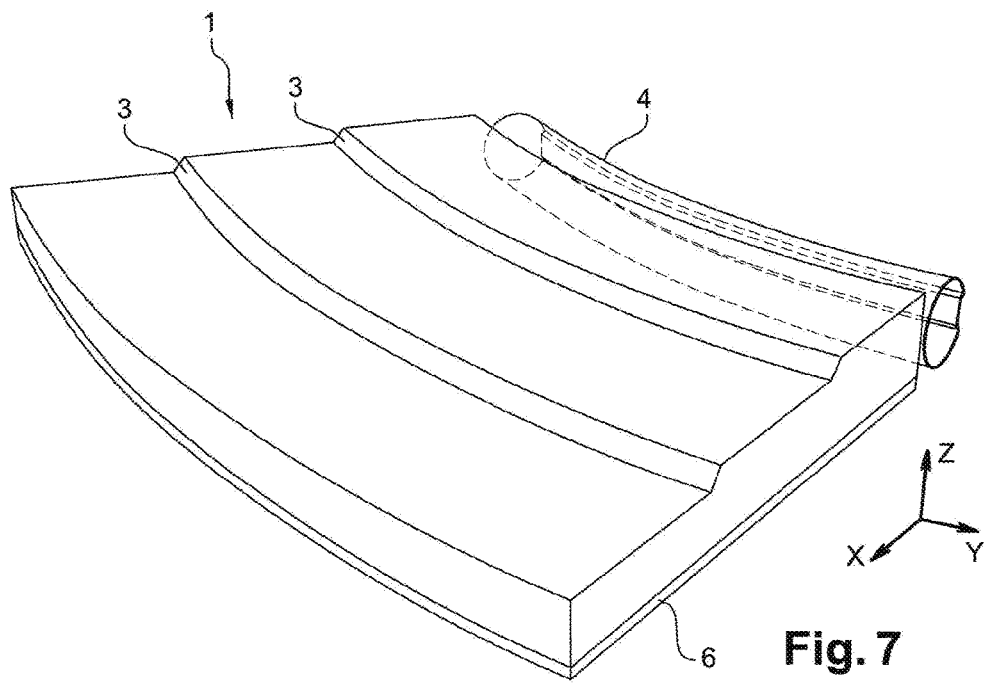

FIG. 7 thus illustrates an embodiment in which the collimator 4 is cylindrical in shape and the optical decoupling zones 3 are arranged inclined on the upper face of the light guide layer 1. The opaque material 6 is arranged over the entirety of the lower face of the light guide layer 1 and the rays of light 2 heading toward the bottom of the light guide layer 1 are thus absorbed by the opaque material 6.

Figure 8:
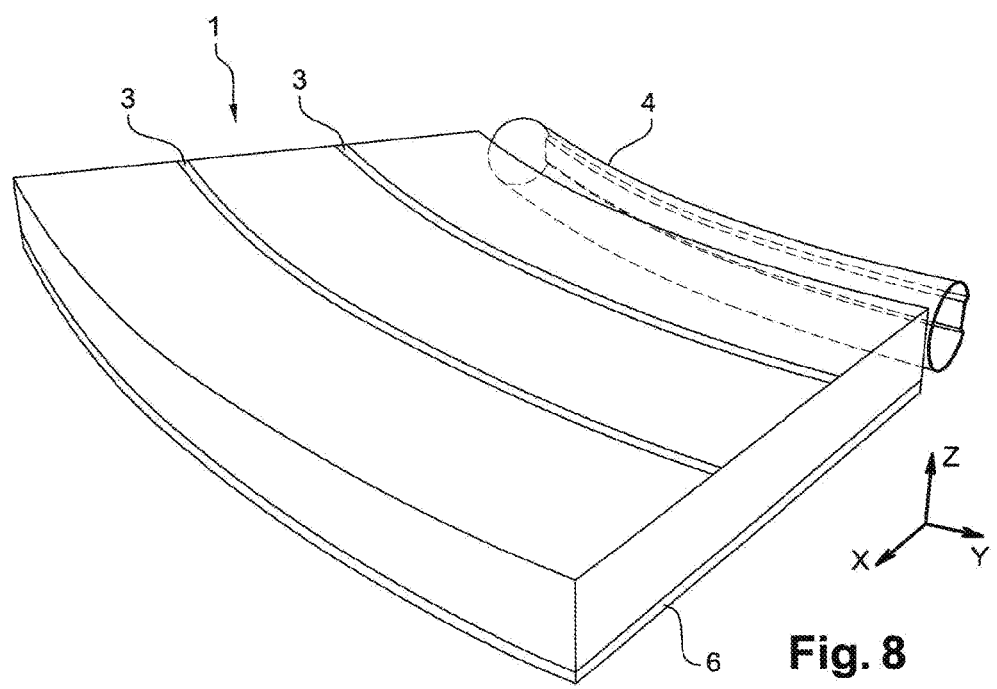
Figure 9:
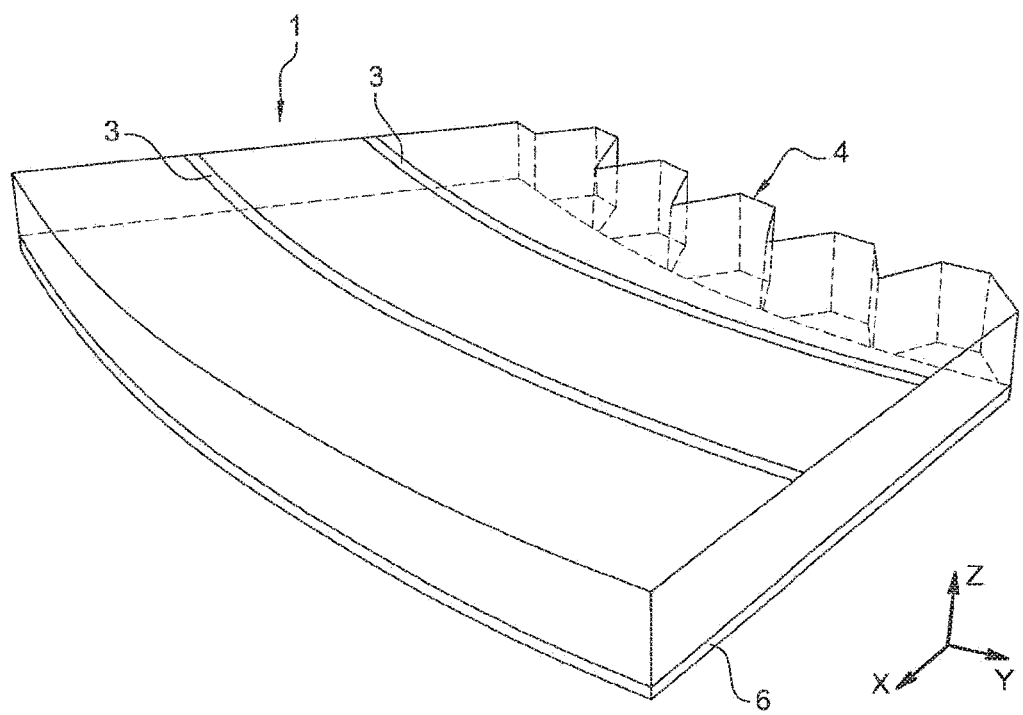

In the embodiment illustrated in FIG. 8, the collimator 4 is cylindrical in shape and the optical decoupling zones 3 are arranged horizontally on the upper face of the light guide layer 1, the opaque material 6 being arranged over the entirety of the lower face of the light guide layer 1.

In the embodiment illustrated in FIG. 9, use is made again of the light guide layer 1 of the embodiment illustrated in FIG. 7, although this time the collimator 4 is integrated into the light guide layer 1, the device thus being made in one piece. In other words, the collimator 4 is formed directly as one piece with the light guide layer 1.

The rest of the description is devoted to various examples of a method of manufacturing the lighting or signaling device.

The method typically comprises two injection phases, namely an injection phase during which the light-absorbing or opaque material 6 is injected, and an injection phase during which the material of which the light guide layer 1 is made is injected.

FIG. 10 illustrates a first embodiment of the method. Use is made of an injection mold 7 which comprises a first part 91 comprising two cavities 913 and a second part 81 which is a mold core. The lower first part 91 is fixed, while the core 81 is able to rotate about a vertical axis of rotation. The core 81 comprises a first sub-part 811 and a second sub-part 812.

Prior to the first injection phase, the first sub-part 811 comes into contact with the first part 91 along the parting line (P). The opaque material 6 is then injected by an injection orifice into the dedicated cavities 913 of the first part 91, the first sub-part 811 being full so as to direct the injection into the first part 91.

A translation-rotation-translation of the core 81 is then performed so that the second sub-part 812 of the core 81 is brought into contact with the first part 91 before the second injection phase. The second sub-part 812 of the core 81 has a cavity 814 of a shape corresponding to that of the light guide layer 1. The cavities 913 with the cavity 814 then form a single-impression mold, which means to say that all of the cavities 913 and 814 can be filled with material at the same time using one and the same single injection orifice chosen from the injection orifices of the injection mold 7 if these cavities 814 and 913 were empty. Each optical decoupling zone 3 is obtained from optical decoupling patterns such as striations or teeth 10. These striations or these teeth 10 are obtained by complementary patterns 914 which project from the upper surface 915 of the first part 91 of the mold, namely are situated above an upper surface 915 of the first part 91. A transparent material is then injected via an injection orifice into the cavity 814 of the core 81 to form the light guide layer 1. The transparent material is therefore overmolded over the opaque material 6, in other words at least part of the opaque material 6 is in contact with the light guide layer 1.

At the end of the second injection, once the injection mold 7 has been removed, the molded product is obtained by demolding.

In a preferred embodiment, the first sub-part 811 of the core 81 comprises a cavity 813 that makes it possible thus to avoid the squashing of the complementary patterns 914 when the first part 91 and the first sub-part 811 are brought into contact.

In a second embodiment as illustrated in FIG. 11, in which elements identical to those of FIG. 10 bear the same references, the method is identical to that of the first embodiment except that the striations or teeth 10 are situated under the upper surface 915 of the first part 91. The cavity 813 of the first sub-part 811 of a second part 92 of the injection mold 7 is therefore no longer needed.

Figure 12:
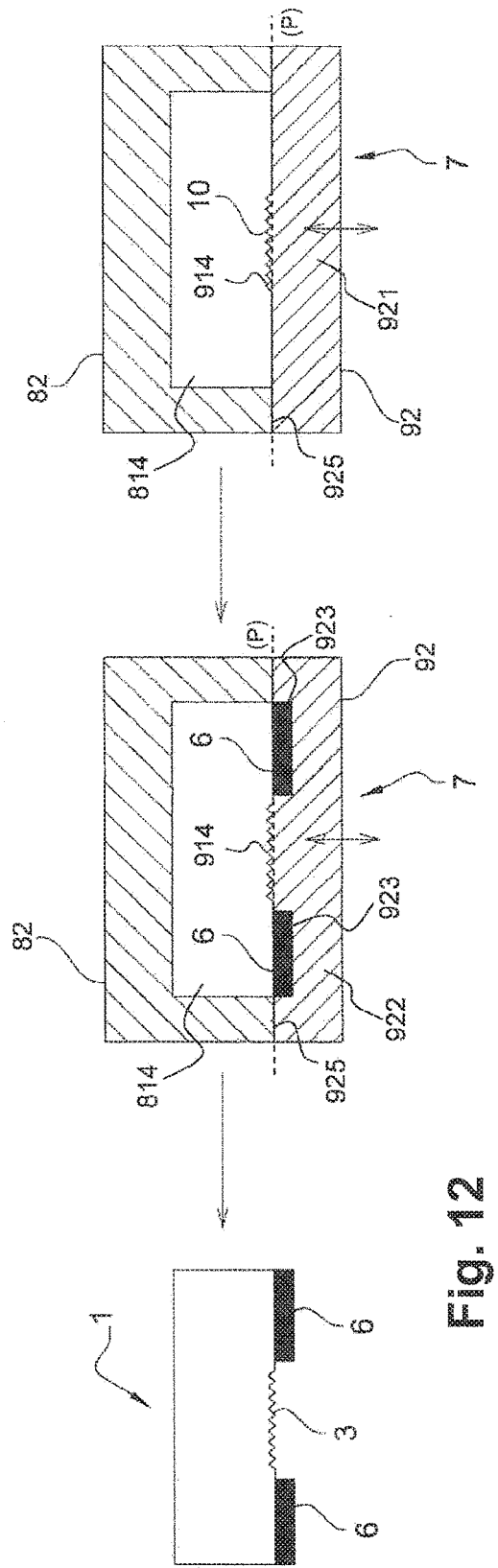

In a third embodiment as illustrated in FIG. 12, the first part 82 of the injection mold 7 or core 81 is fixed, while the second part 92 of the injection mold 7 has rotational mobility about a vertical axis.

The first part 82 has a cavity 814 of a shape corresponding to that of the light guide layer 1. Each optical decoupling zone 3 is obtained using optical decoupling patterns such as striations or teeth 10. These striations or these teeth 10 are obtained by virtue of complementary patterns 914 which project from the upper surface 925 of the first sub-part 921 of the injection mold 7, namely are situated above the upper surface 925 of the first sub-part 921.

Before the first injection phase, the first sub-part 921 comes into contact with the first part 82 along the parting line (P). A transparent material is then injected via an injection orifice into the dedicated cavity 814 of the first part 82, the first sub-part 921 being full so as to direct the injection into the first part cavity 82.

A translation-rotation-translation movement of the second part 92 is then performed so that the second sub-part 922 is brought into contact with the first part 82 before the second injection phase. The cavities 923 with the cavity 814 then form a single-impression mold cavity, which means to say that all the cavities 923 and 814 can be filled with material at the same time using one and the same single injection orifice chosen from among the injection orifices of the injection mold 7 if these cavities 814 and 913 were empty.

That means that the opaque material 6 can be injected into dedicated cavities 923 of the second sub-part 922. The opaque material 6 is therefore overmolded onto the transparent material, or in other words at least some of the opaque material 6 is in contact with the light guide layer 1. Because the cavity 814 of the first part is full as a result of the first injection, the second injection is thus directed toward the cavities 923 of the second sub-part 922.

At the end of the injection method, once the injection mold 7 has been removed, the molded product is obtained by demolding.

Figure 13:
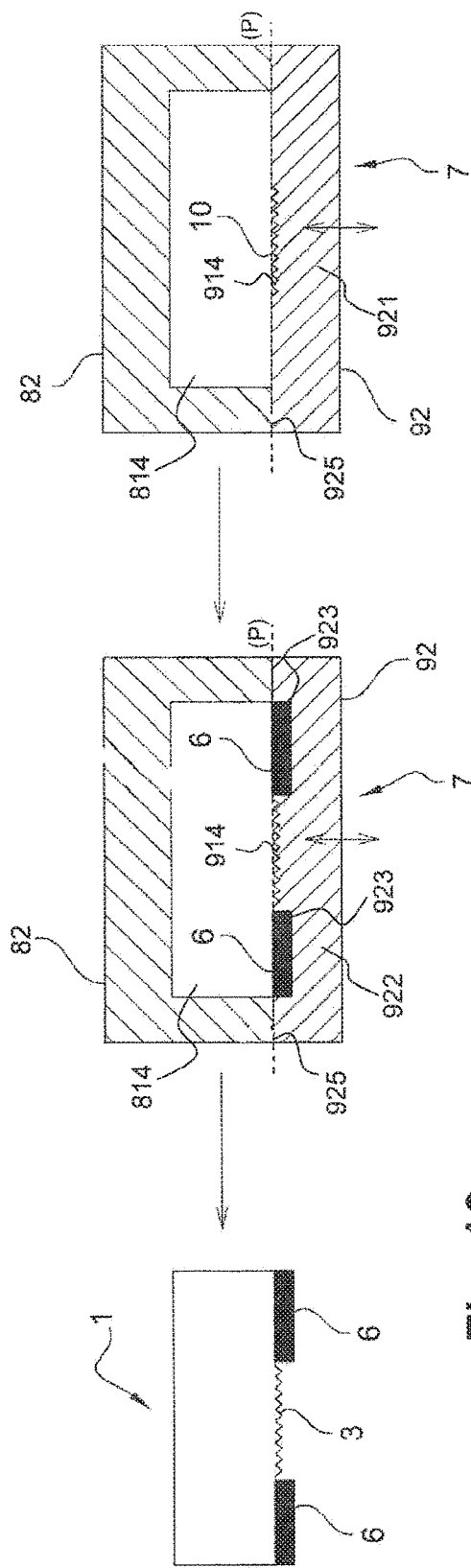

In a fourth embodiment as illustrated in FIG. 13, the method is identical to that of the third embodiment except that the striations or teeth 10 are situated under the upper surface 925 of the first sub-part 921 and under the upper surface 925 of the second sub-part 922.

Figure 14:
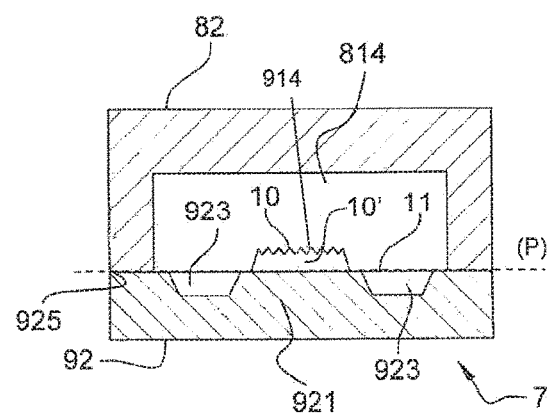

FIG. 14 illustrates a fifth embodiment. This embodiment differs from FIG. 13 in that the striations or teeth 10 on the light guide layer 1 are in a cavity 10' of the light guide layer 1, namely set back from the lower face thereof.

During the first injection phase illustrated in FIG. 14, the first sub-part of 921 the mobile second part 92 comprises cavities 923. The cavity 10' of the first part 82, which is fixed, is surrounded by two plates 11 the width of each of which is greater than that of each cavity 923 of the first sub-part 921 of the second part 92. Each plate 11 is intended to come to face each cavity 923 during the first injection phase, namely during the molding of the light guide layer 1. Thus, the edges of each cavity 923 of the first sub-part 921 of the second part 92 of the injection mold 7 come into sealed contact with the corresponding plate 11. Because the cavity 10' is between two plates 11, it will not be filled during the injection of the absorbent material into the cavities 923 of the part 92 of the mold (second injection phase).

The advantage is that during the first injection phase, there is no longer any need to have striations to complement the striations or teeth 10 of the light guide layer 1 on the second part 92 of the mold, as illustrated in FIGS. 12 and 13, in order to prevent absorbent material from being overmolded onto these striations.

In an alternative form of the fifth embodiment, not illustrated, the first part 82 comprises at least two consecutive cavities 10' separated by at least one plate 11.

In an alternative form of the fifth embodiment, not illustrated, the second part 92 comprises as many cavities 923 as there are plates 11 in the first part 82.

Each embodiment may comprise a solidification step after one or each injection step. This solidification step consists in waiting for a defined length of time before moving on to the next step.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A motor vehicle light device comprising:
    a light guide layer equipped with optical decoupling zones, and a light generator able to send light toward said light guide layer;
    wherein said light guide layer is locally covered with a light-absorbing material;
    wherein said optical decoupling zones are arranged on a first face of said light guide layer and in that said light-absorbing material is arranged on an entirety of a second face of said light guide layer that is an opposite face to said first face.

2. The motor vehicle light device according to claim 1, wherein said light generator comprises a light-emitting diode.

3. The motor vehicle light device according to claim 2, wherein said motor vehicle light device comprises a collimator and/or a light guide receiving rays of light from said light-emitting diode and passing them on toward said light guide layer.

4. The motor vehicle light device according to claim 3, wherein said collimator and/or said light guide are formed as an integral part of said light guide layer.

5. The motor vehicle light device according to claim 1, wherein said light generator is integrated into said light guide layer.

6. The motor vehicle light device according to claim 1, wherein said light-absorbing material is an opaque material.

7. The motor vehicle light device according to claim 1, wherein said optical decoupling zones are able to pass light in a direction different than a direction of light coming from said light generator.

8. The motor vehicle light device according to claim 1, wherein said optical decoupling zones are able to pass light in a direction identical to a direction of light coming from said light generator.

9. The motor vehicle light device according to claim 1, wherein said motor vehicle light device is obtained by injection molding using a mold comprising a first part and a second part, said second part comprising accommodating zones for accommodating said light-absorbing material.

10. The motor vehicle light device according to claim 9, wherein said motor vehicle light device is obtained using a method comprising an injection phase during which said light-absorbing material is injected and an injection phase during which a material of which said light guide layer is made is injected.

11. The motor vehicle light device according to claim 3, wherein said motor vehicle light device comprises a collimator and/or a light guide receiving rays of light from said light-emitting diode and passing them on toward said light guide layer.

12. The motor vehicle light device according to claim 3, wherein said light generator is integrated into said light guide layer.

13. The motor vehicle light device according to claim 3, wherein said light-absorbing material is an opaque material.

14. The motor vehicle light device according to claim 3, wherein said optical decoupling zones are able to pass light in a direction different than a direction of light coming from said light generator.

15. The motor vehicle light device according to claim 3, wherein said optical decoupling zones are able to pass light in a direction identical to a direction of light coming from said light generator.

16. The motor vehicle light device according to claim 3, wherein said optical decoupling zones are arranged on a first face of said light guide layer and in that said light-absorbing material is arranged on an entirety of a second face of said light guide layer that is an opposite face to said first face.

17. The motor vehicle light device according to claim 3, wherein said optical decoupling zones are arranged on a second face of said light guide layer and in that said light-absorbing material is arranged on a second face of said light guide layer, between said optical decoupling zones.

18. A motor vehicle light device comprising:
a light guide layer equipped with optical decoupling zones, and a light generator able to send light toward said light guide layer;
wherein said light guide layer is locally covered with a light-absorbing material;
wherein said optical decoupling zones are arranged on a second face of said light guide layer and in that said light-absorbing material is arranged on a second face of said light guide layer, between said optical decoupling zones.

19. A motor vehicle light device comprising:
a light guide layer equipped with optical decoupling zones, and a light generator able to send light toward said light guide layer;
wherein said light guide layer is locally covered with a light-absorbing material;
wherein said optical decoupling zones are arranged on walls of said light guide layer, said walls being oriented in such a way as to form an angle, with a first wall and in that said light-absorbing material is arranged on an entirety of a second face of said light guide layer.

\* \* \* \* \*